US011856889B2

(12) United States Patent
Faust et al.

(10) Patent No.: US 11,856,889 B2
(45) Date of Patent: Jan. 2, 2024

(54) AUTOMATED CAMERA SYSTEM CONTROL FOR HARVESTING MACHINE UNLOADING

(71) Applicant: Deere & Company, Moline, IL (US)

(72) Inventors: Jeremy J. Faust, Grimes, IA (US); Kellen O'Connor, Grimes, IA (US)

(73) Assignee: Deere & Company, Moline, IL (US)

( * ) Notice: Subject to any disclaimer, the term of this patent is extended or adjusted under 35 U.S.C. 154(b) by 584 days.

(21) Appl. No.: 17/034,890

(22) Filed: Sep. 28, 2020

(65) Prior Publication Data

US 2022/0095539 A1 Mar. 31, 2022

(51) Int. Cl.
*A01D 41/127* (2006.01)
*A01D 90/02* (2006.01)
*B65G 67/22* (2006.01)
*H04N 23/69* (2023.01)

(52) U.S. Cl.
CPC ........... *A01D 41/127* (2013.01); *A01D 90/02* (2013.01); *B65G 67/22* (2013.01); *H04N 23/69* (2023.01); *B65G 2814/0302* (2013.01)

(58) Field of Classification Search
CPC .. A01D 41/127; A01D 90/02; A01D 41/1217; A01D 45/00; B65G 67/22; B65G 2814/0302; H04N 23/69; A01B 79/02
USPC .......................................................... 701/50
See application file for complete search history.

(56) References Cited

U.S. PATENT DOCUMENTS

| 2011/0273593 | A1* | 11/2011 | Cohen ................ H04N 23/843 382/164 |
| 2014/0311113 | A1* | 10/2014 | Bonefas ................ A01D 75/02 56/10.2 R |
| 2016/0323519 | A1 | 11/2016 | Boydens et al. |
| 2017/0034416 | A1 | 2/2017 | Heilman et al. |
| 2019/0149672 | A1* | 5/2019 | Ikeda ................ H04N 1/00177 358/1.15 |
| 2020/0133262 | A1 | 4/2020 | Suleman et al. |

FOREIGN PATENT DOCUMENTS

EP 3510851 A1 7/2019

OTHER PUBLICATIONS

Extended European Search Report and Written Opinion issued in European Patent Application No. 21189973.7, dated Feb. 1, 2022, in 05 pages.

* cited by examiner

*Primary Examiner* — Muhammad Shafi
(74) *Attorney, Agent, or Firm* — Christopher J. Volkmann; Kelly, Holt & Chrisenson, PLLC

(57) ABSTRACT

A harvesting machine includes a header configured to gather harvested material into the harvesting machine during a harvesting operation, a conveyance subsystem configured to convey the harvested material from the harvesting machine to a receiving vehicle during the harvesting operation, an image capture system comprising at least one optical sensor, and a control system configured to determine a position of the receiving vehicle relative to the harvesting machine, determine an image magnification factor based on the determined position, and display, on a display device, an image of a portion of the receiving vehicle based on the image magnification factor.

18 Claims, 12 Drawing Sheets

AUTOMATED CAMERA SYSTEM CONTROL FOR HARVESTING MACHINE UNLOADING

FIELD OF THE DESCRIPTION

The present description generally relates to harvesting machines that fill carts, semitrailers, or other agricultural receiving vehicles. More specifically, but not by limitation, the present description relates to automated control of a camera view during unloading operation based on an indication of receiving vehicle position.

BACKGROUND

There are a wide variety of different types of agricultural vehicles. Some vehicles include harvesters, such as forage harvesters or other harvesters, that harvest grain or other crop. Such harvesters often unload into carts, which may be pulled by tractors, or semitrailers, as the harvesters are moving.

By way of example, while harvesting in a field using a forage harvester, an operator attempts to control the forage harvester to maintain harvesting efficiency, during many different types of conditions. The soil conditions, crop conditions, etc. can all change. This may result in the operator changing control settings. This means the operator needs to devote a relatively large amount of attention to controlling the forage harvester.

At the same time, a semitruck or tractor-pulled cart, is often in position relative to the forage harvester (e.g., alongside the forage harvester or behind the forage harvester) so that the forage harvester can fill the truck or cart, while moving through the field. In some current systems, this requires the operator of the forage harvester to control the position of the unloading spout and flap so that the truck or cart is filled evenly, but not over filled. Even a momentary misalignment between the spout and the truck or cart may result in hundreds of pounds of harvested material being dumped on the ground, rather than in the truck or cart.

The discussion above is merely provided for general background information and is not intended to be used as an aid in determining the scope of the claimed subject matter.

SUMMARY

A harvesting machine includes a header configured to gather harvested material into the harvesting machine during a harvesting operation, a conveyance subsystem configured to convey the harvested material from the harvesting machine to a receiving vehicle during the harvesting operation, an image capture system comprising at least one optical sensor, and a control system configured to determine a position of the receiving vehicle relative to the harvesting machine, determine an image magnification factor based on the determined position, and display, on a display device, an image of a portion of the receiving vehicle based on the image magnification factor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 5-1 and 5-2 (collectively referred to as FIG. 5) is a flow diagram illustrating an example operation of a harvesting machine.

DETAILED DESCRIPTION

Figure 1:
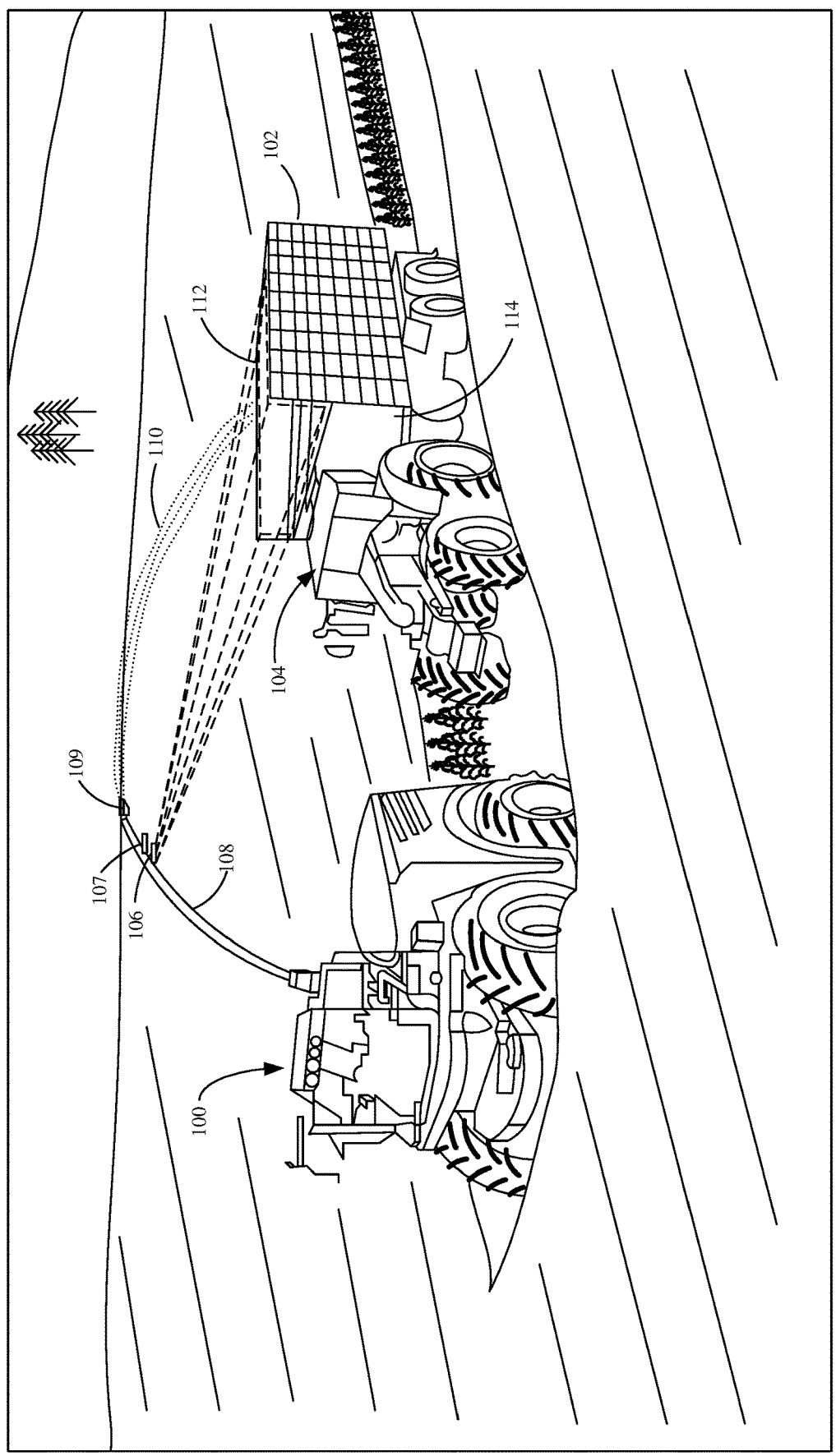
FIG. 1 is a pictorial illustration of one example of a forage harvester filling a tractor-pulled receiving vehicle, with the receiving vehicle following the forage harvester.

As discussed above, it can be very difficult for an operator to maintain high efficiency in controlling a forage harvester, or other type of harvesting machine, and also to optimally control the unloading mechanisms to achieve an efficient fill strategy in filling a receiving vehicle. Such a fill strategy desirably results in a receiving vehicle that is evenly full, so that there are no empty spots in the receiving vehicle, or sub-optimally filled spots, and so that the vehicle is not over filled. This often means that the operator needs to control the position of the spout relative to the receiving vehicle, and the flaps (to control material trajectory), offsets between the spout and the edges of the receiving vehicle (both front and rear edges, and side edges), among other things.

In order to address these issues, some automatic or active cart filling control systems have been developed to automate portions of this process. These types of systems currently provide automation for simplifying the unloading process. One such automatic fill control system, as is described in greater detail below, uses remote sensing to track the position of the receiving vehicle and to determine the location of where to deposit crop in the receiving vehicle. A stereo camera on the spout of the harvester captures an image of the receiving vehicle. The stereo camera has a field of view that allows the automatic fill control system to capture images of the opening or receiving area of the receiving vehicle. An image processing system determines dimensions of the receiving vehicle, and the distribution of the crop deposited inside it. The sensing system also detects crop height within the receiving vehicle, in order to automatically aim the spout toward empty spots and control the flap position to achieve a more even fill, while reducing spillage.

In some implementations, a camera view, such as a live video feed, from the camera is provided to the operator through a user interface display in the operator compartment. This allows the operator to observe the progress of filling the receiving vehicle in real-time. Also, the user interface display can include user actuatable controls that allow the operator to control various aspects of the filling operation (e.g., control the harvester speed, control the spout and/or flap position, control the receiving vehicle position, etc.).

To accommodate differing field conditions and/or harvesting progress (e.g., whether the area of the field to the side of the current harvester position has already been harvested), the unloading mechanisms of the harvester are actuatable between a side unloading orientation in which the receiving vehicle is alongside the harvester and a rear unloading orientation in which the receiving vehicle is behind and follows the harvester. The stereo camera (which is often mounted on the spout) has a relatively wide field of view (e.g., one hundred and thirty degrees, or greater, in one example) that allows the automatic fill control system to capture images of the opening or receiving area of the receiving vehicle when in the side unloading orientation. However, when in the rear unloading orientation, the camera is positioned further away from the receiving area of the receiving vehicle than when the receiving vehicle is alongside the harvester. This increased distance between the camera position and the receiving area of the receiving vehicle (located behind the harvester) results in a viewing profile of the receiving area that is suboptimal or otherwise less desirable to the operator. That is, it is more difficult for the operator to observe details of the filling operation from the camera view when the receiving vehicle is behind the harvester than when the receiving vehicle is alongside the harvester.

As discussed in further detail below, an example control system detects the relative position of the receiving vehicle (i.e., whether it is in the side or rear unloading orientation) and/or the distance from the camera to the receiving area of the receiving vehicle, such as by directly sensing the receiving vehicle and/or sensing a position of the spout. The control system automatically controls the view provided to the operator, such as by automatically zooming the view of the receiving vehicle. Before discussing the control system in further detail, examples of harvesters and receiving vehicles will first be provided.

FIG. 1 is a pictorial illustration showing one example of a self-propelled forage harvester 100 filling a tractor-pulled grain cart (or receiving vehicle) 102. In the example shown in FIG. 1, a tractor 104, that is pulling grain cart 102, is positioned directly behind forage harvester 100. Further, in the illustrated example, forage harvester 100 includes an automatic cart filling control system (described in greater deal below) that uses a camera 106 mounted on the spout 108, which includes a flap 109, through which the harvested material 110 is traveling. Camera 106 captures an image of the receiving area 112 of cart 102. It is noted that while one camera is illustrated, in one example a plurality of cameras can be mounted on spout 108. For example, a second camera 107 having different characteristics (e.g., different field of view, different focal length and/or zoom capabilities, etc.) can be utilized.

The automatic cart filling control system includes image processing, as discussed above, that can gauge the height of harvested material in cart 102, and the location of that material. It thus automatically controls the position of spout 108 to direct the trajectory of material 110 into the receiving area 112 of cart 102 to obtain an even fill throughout the entire length of cart 102, while not overfilling cart 102. By automatically it is meant, for example, that the operation is performed without further human involvement except, perhaps, to initiate or authorize the operation.

It can be seen in the example of FIG. 1, that the camera 106 can capture an image of a portion of the cart 102. For instance, it can capture an image of the forward portion 114 of cart 102. Thus, in one example, optical or visual features of that forward portion 114 of cart 102 can be used to uniquely identify cart 102, or to identify the type of the cart 102. Also, the optical or visual features of cart 102 can be utilized in determining whether cart 102 is in a side-by-side orientation or is located behind harvester 100. Further yet, the capture images can be processed to determine the distance of receiving area 112 to harvester 100.

A unique cart identifier, or type identifier, can be used to automatically determine and apply settings values to the automatic cart filling control system so that the cart 102 is filled, according to a predetermined strategy, without the operator needing to interact with the automatic cart filling control system to input settings corresponding to the cart.

Figure 2:
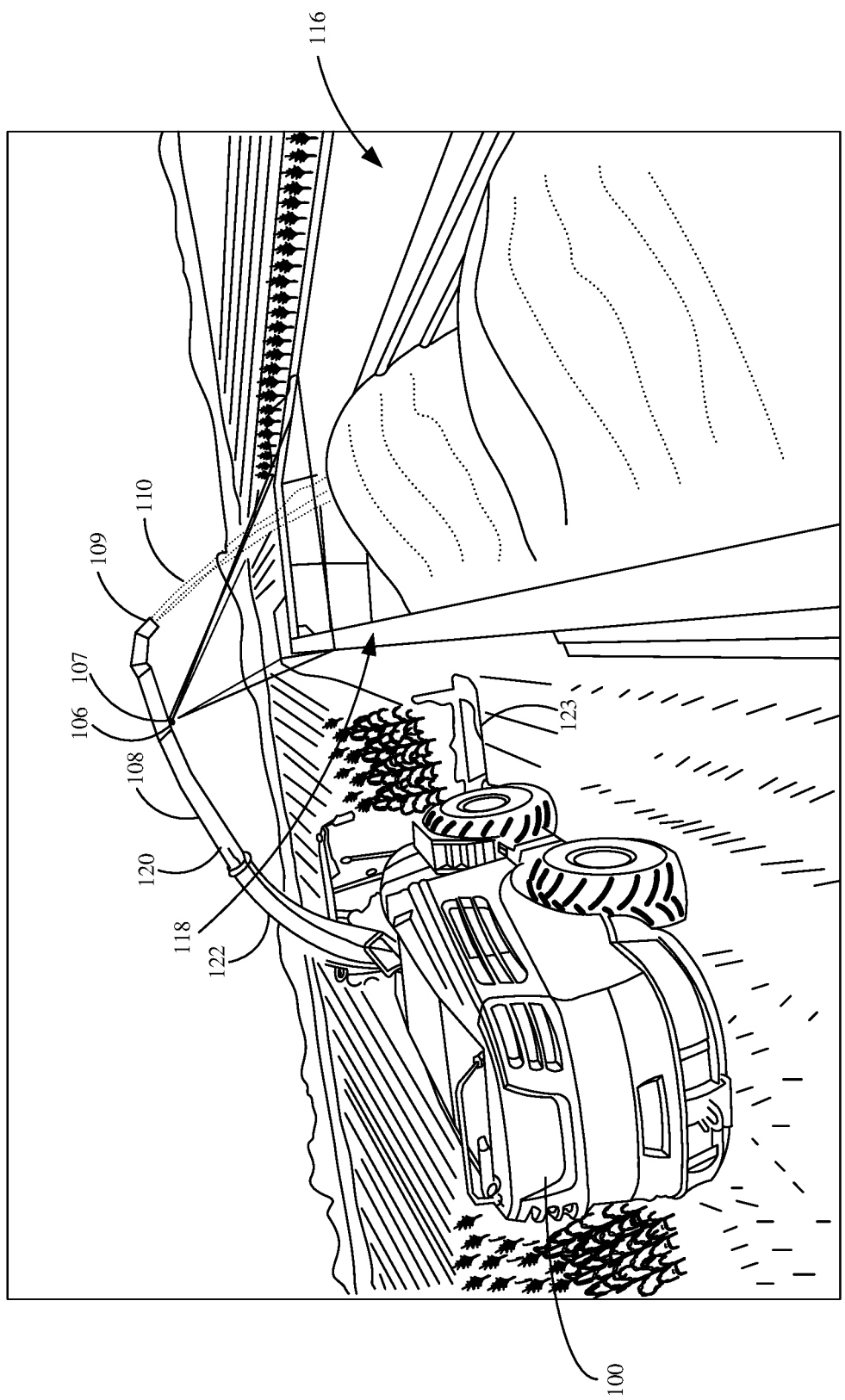
FIG. 2 is a pictorial illustration of one example of a forage harvester filling a receiving vehicle that is alongside the forage harvester.

FIG. 2 is a pictorial illustration showing another example of a self-propelled forage harvester 100, this time loading a semi-trailer (or receiving vehicle) 116 in a configuration in which a semitractor is pulling semi-trailer 116 alongside forage harvester 100. Therefore, the spout 108 and flap 109 are positioned to unload the harvested material 110 to fill trailer 116 according to a pre-defined side-by-side fill strategy. Again, FIG. 2 shows that camera 106 can capture an image of semi-trailer 116. In the example illustrated in FIG. 2, the field of view of camera 106 is directed toward the receiving area of trailer 116 so that image processing can be performed to identify the height of the material 110 in trailer 116, and to identify the position of the material along the elongate axis of trailer 116 (e.g., along the front-to-back axis). In this way, the automatic cart filling control system can control the position of spout 108 and flap 109 to direct the material 110 into trailer 116 according to a strategy that provides a relatively even fill, without over filling trailer 116.

In the example shown in FIG. 2, it can be seen that camera 106 can be positioned to have a field of view that captures an image of the side portion 118 of trailer 116. Thus, the visual or optical features of the side portion of trailer 116 can be used to uniquely identify trailer 116, or at least to identify the type of the trailer 116. Based on the unique trailer identifier or the type identifier, the settings values for the automatic cart filling control system can be obtained so that the cart is filled in a cart-specific way or in a cart type-specific way, depending upon whether the cart is uniquely identified or the cart type is identified.

The visual features can be detected using a computer vision analysis system, using a deep neural network, or using other image processing techniques and mechanisms for identifying visual features or characteristics in an image, a set of images, or a video.

Also, in the illustrated example, a portion of spout 108 comprises a removable extension 120 that can be selectively added by the operator to change the location of flap 109 (and camera(s) 106, 107) relative to harvester 100. For example, a plurality of different extensions, having differing lengths, can be selectively coupled between a base portion 122 of spout 108 and flap 109. Illustratively, the width of the selected header 123 defines a minimum distance of trailer 116 from harvester 100, to avoid contact between harvester 100 and trailer 116 (or the semitractor pulling trailer 116). Thus, the operator can attach different extensions for eight row headers, ten row headers, twelve row headers, etc. As discussed in further detail below, the control system of harvester 100 can be is configured to identify the particular extension 120 being used in the current operation. This identification can be done automatically, such as by automatic detection of a physical tag on extension 120, and/or based on operator input.

Figure 3:
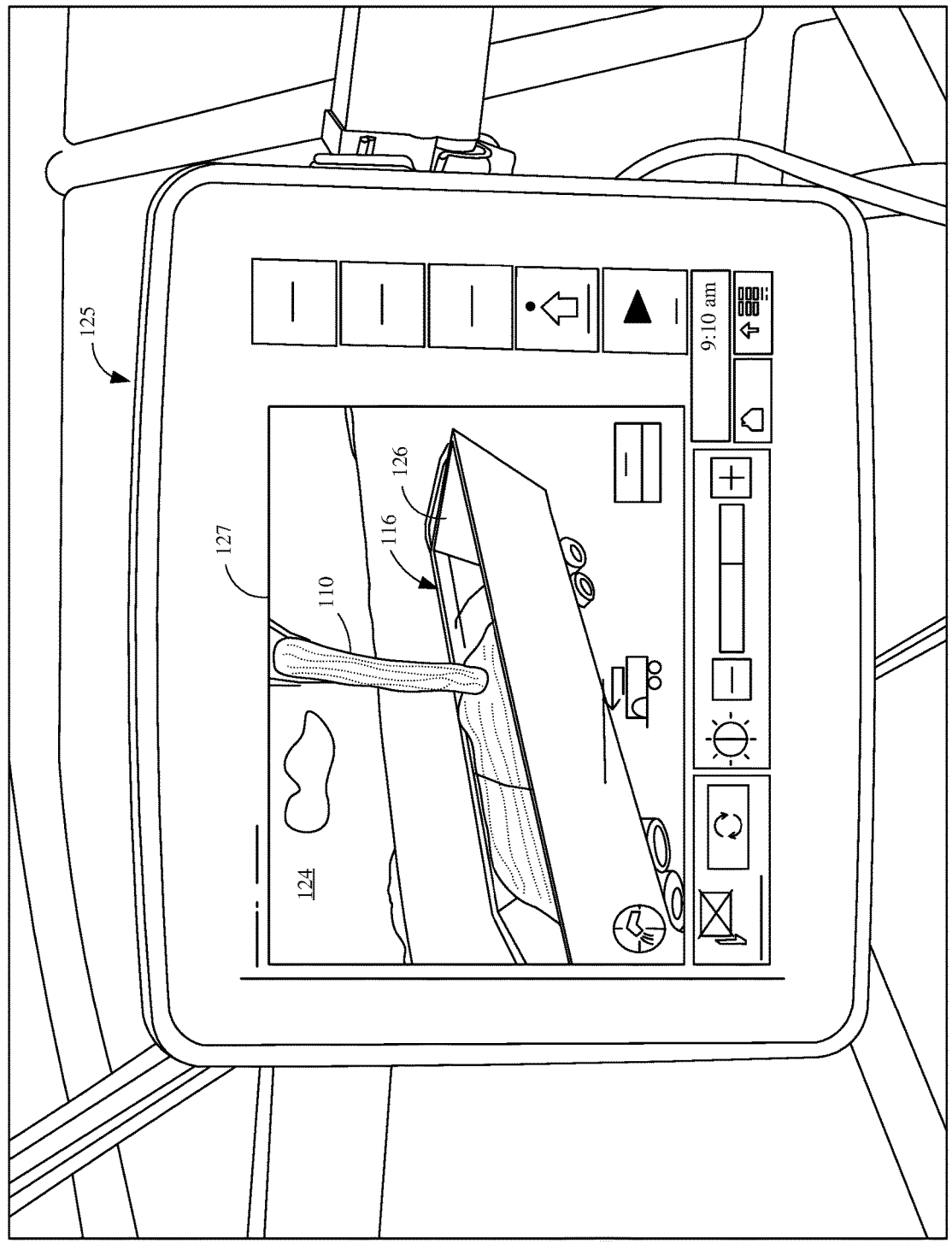
FIG. 3 is a pictorial illustration of one example of a user interface display that can be generated by an automatic fill control system, for an operator of a forage harvester.

FIG. 3 is a pictorial illustration showing one example of a user interface display 124 that can be displayed on a display mechanism 125, for the operator in an operator compartment of forage harvester 100. The user interface display 124 in FIG. 3 includes a camera view display pane 127 that shows a view of images captured by camera 106 (or 107) of material 110 entering trailer 116. The image processing system in the automatic cart filling control system illustratively identifies the perimeter of the opening 126 in trailer 116 and also processes the image of the material 110 in trailer 116 to determine its fill height relative to opening 126. User interface display 124 can be augmented (such as with overlays, icons, labels, etc.) to identify various aspects of the unloading process. For example, the crop landing point can be highlighted on display 124. Also, areas of the display can be highlighted (or otherwise identified) based on the height or contour of the crop residing in trailer 116. Thus, the operator can more easily identify areas of the receiving vehicle that are more or less full. Further yet, display 124 can include user interface controls that allow the operator to control the spout position, the flap angle, the speed of harvester 100 relative to trailer 116, among other controls.

It can also be seen that the camera can easily capture an image of the side portion 118 of trailer 116 so that visual or optical features of the side portion 118 of trailer 116 can be used to uniquely identify the trailer or the trailer type. Further yet, the capture images can be processed to determine the distance to opening 126.

Figure 4:
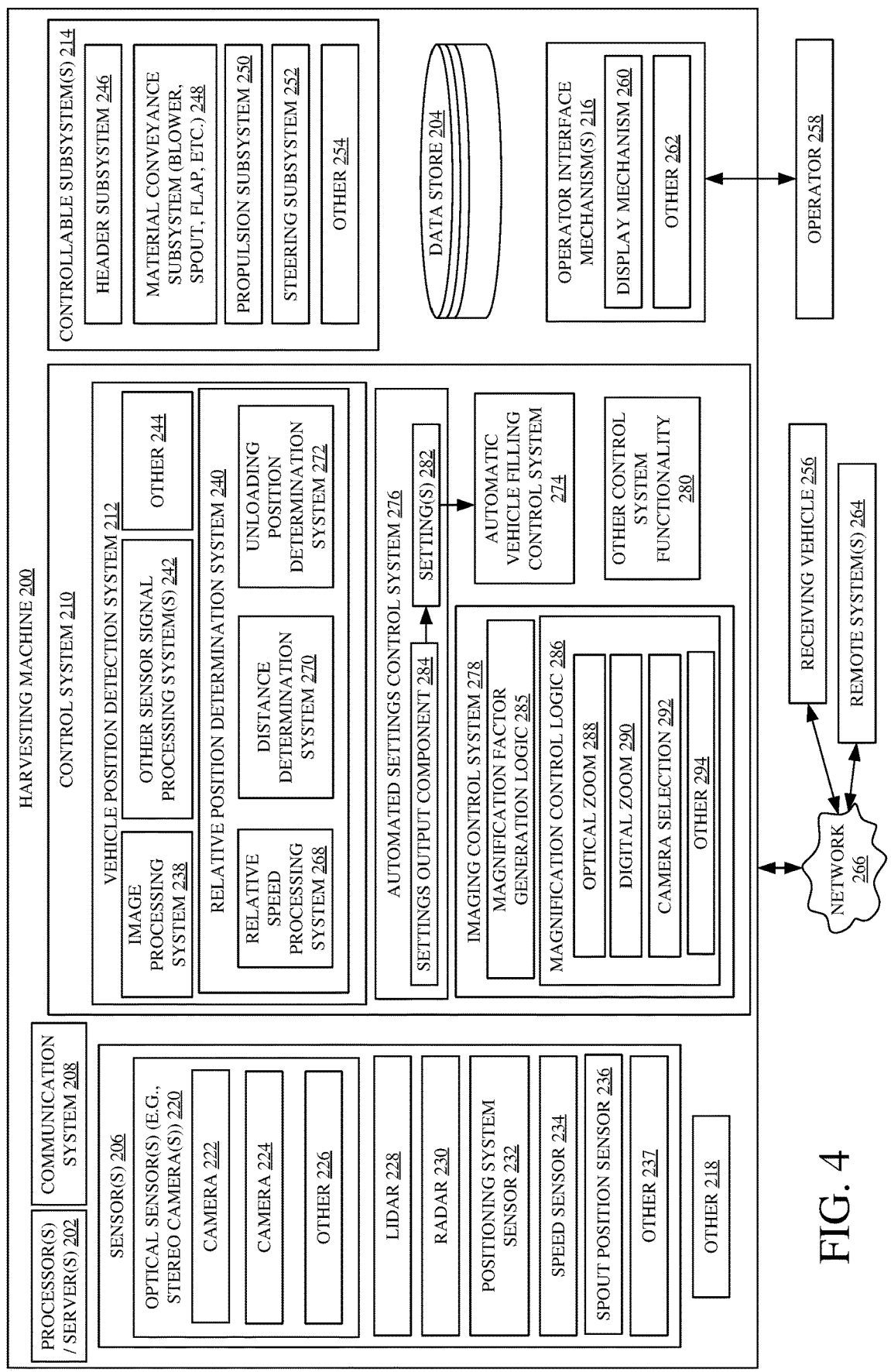
FIG. 4 is a block diagram of one example of a harvesting machine.

FIG. 4 is a block diagram showing one example of a harvesting machine 200, such as, but not limited to, harvesters 100 illustrated in FIGS. 1 and 2. Harvesting machine 200 illustratively includes one or more processors or servers 202, a data store 204, a set of sensors 206, a communication system 208, a control system 210 (which can include a vehicle position detection system 212), controllable subsystem(s) 214, operator interface mechanism(s) 216, and it can include other items 218.

Sensors 206 can include one or more optical sensors 220 (such as one or more stereo cameras 222 and 224 or other video capture system, or other types of optical sensors 226), a LIDAR (light detection and ranging) sensor 228, a RADAR sensor 230, a positioning system sensor 232, a speed sensor 234, a spout position sensor 236, and/or other sensors 237.

Vehicle position detection system 212 includes an image processing system 238, a relative position determination system 240, other sensor signal processing system(s) 242, and it can include other items 244.

Controllable subsystems 214 can include a header subsystem 246, material conveyance subsystem (e.g., spout, blower, flap, etc.) 248, propulsion subsystem 250, steering subsystem 252, and it can include other items 254. Subsystem(s) 214 are configured to perform a harvesting operation that gathers harvested material into harvesting machine 200 and conveys the harvested material from harvesting machine 200 to a receiving vehicle 256 using conveyance subsystem 248. Examples of receiving vehicle 256 include, but are not limited to, cart 102 or trailer 116, shown above. Also, it should be noted that any or all of system 210 can be located at a remote location, such as in the cloud or elsewhere. It is shown on harvesting machine 200 for sake of example only.

FIG. 4 also shows that, in one example, operator 258 can interact with operator interface mechanisms 216 in order to control and manipulate harvesting machine 200. Operator interface mechanisms 216 can include a display mechanism 260 (such as display mechanism 125 discussed above) and a wide variety of other items 262. Therefore, operator interface mechanisms 216 can be any of a wide variety of operator interface mechanisms, such as levers, joysticks, steering wheels, pedals, linkages, buttons, a touch sensitive display screen, a microphone and speaker (where speech recognition and speech synthesis are provided), among a wide variety of other audio, visual, and haptic mechanisms.

In addition, receiving vehicle 256 and remote system(s) 264 can communicate with harvesting machine 200 over network 266. Network 266 can thus be any of a wide variety of different types of networks, such as a near field communication, wide area network, a local area network, a cellular communication network, or any of a wide variety of other networks or combinations of networks.

As discussed above, optical sensor(s) 220 can capture an image of the receiving vehicle 256 (either the cart, or the pulling vehicle, or both). In one example, captured stereo images can be processed to identify a distance of receiving vehicle 256 from harvesting machine 200. The same can be done with LIDAR sensor 228 or RADAR sensor 230. In addition, positioning system sensor 232 can be a GPS receiver or other positioning system that receives coordinates of the receiver in a global or local coordinate system. Communication system 208 can be configured to communicate with receiving vehicle 256 over network 266. Thus, harvesting machine 200 and vehicle 256 can communicate their positions, and these positions can be used to determine speeds of machine 200 and vehicle 256, as well as the position of vehicle 256 relative to machine 200.

Speed sensor 234 can be a sensor that senses the speed of rotation of an axle, or a ground-engaging element (such as a wheel), or it can be another sensor that provides an indication of ground speed of harvesting machine 200. It will be noted that receiving vehicle 256 can also be fitted with a speed sensor so that the speed of vehicle 256 can be communicated (using communication system 208) to harvesting machine 200.

Spout position sensor 236 is configured to sense a current position of the spout (e.g., spout 108). For example, spout position sensor 236 can detect a relative position and/or angle of the flap which indicates a direction of material discharge. Alternatively, or in addition, sensor 236 can detect a position of motor(s) or other actuator(s) that rotate the spout.

Relative position determination system 240 detects the relative positions of harvesting machine 200 and receiving vehicle 256, with respect to one another. For example, system 240 can include a relative speed processing system 268 configured to process the relative speed of receiving vehicle 256 and harvesting machine 200, a distance determination system 270 configured to determine a distance between receiving vehicle 256 and harvesting machine 200, and an unloading position determination system 272 configured to determine a current unloading position of receiving vehicle (e.g., whether it is in a rear unloading configuration shown in FIG. 1 or a side unloading configuration shown in FIG. 2). As discussed in further detail below, the unloading position can be determined based on image processing performed by image processing system 238 on images from optical sensor(s) 220 (e.g., whether an image shows a front or side profile of receiving vehicle). The unloading position can also be determined based on the position signal of vehicle 256 (e.g., whether the GPS coordinates indicate that vehicle 256 is behind or alongside machine 200). The unloading position can also be determined based on operator input through mechanisms 216. Further yet, the unloading position can be determined based on sensor inputs relative to material conveyance subsystem 248 (e.g., a current spout position, a predicted crop landing location, etc.).

In the illustrated example, control system 210 includes an automatic vehicle filling control system 274, an automated settings control system 276, an imaging control system 278, and it can include a wide variety of other control system functionality 280.

Automatic vehicle filling control system 274 illustratively controls the fill operation for receiving vehicle 256. System 274 can control various controllable features, such as the fill strategy (e.g., front to back, back to front, etc.), offsets, fill level, percent fill, etc. System 274 controls those portions of the filling operation based upon one or more settings 282 that it receives from a setting output component 284. In some cases, operator 258 can manipulate operator interface mechanisms 216 to provide settings 282. In other cases, automated settings control system 276 identifies the particular receiving vehicle 256 that is being filled (based upon its visual or optic features captured by sensors 206) or it identifies the type of receiving vehicle 256 that is being filled, based upon those same features. If this particular cart (or cart type) has been seen before, then automated settings control system 276 accesses cart feature-to-settings maps or the cart type-to settings maps and obtains setting values based upon the particular cart or cart type. It then outputs those settings values as settings 282 to automatic vehicle filling control system 274. The setting values can indicate a variety of different things, such as the desired fill strategy, the desired fill height, offset distances, etc.

Imaging control system 278 is configured to control the capturing of images by optical sensor(s) 220 and/or the display of captures images on display mechanism 260. Illustratively, imaging control system 278 includes magnification factor generation logic 285 configured to generate an image magnification factor and magnification control logic 286 configured to control harvesting machine 200 based on the generated image magnification factor. This is discussed in further detail below. Briefly, in one example, the image magnification factor indicates a magnification of the visualization of the receiving area being displayed to operator 258 on display mechanism 260. For instance, the image magnification factor indicates an amount by which the visualization of the receiving area of receiving vehicle 256 is to be enlarged on the displayed view, which can enhance the operator's view of the receiving area when conveyance subsystem 248 is switched from side unloading to rear unloading.

Magnification control logic 286 illustratively includes optical zoom logic 288, digital zoom logic 290, camera selection logic 292, and it can include other items 294 as well. Optical zoom logic 288 is configured to control optical zooming of camera 222 and/or camera 224 to achieve a desired focal length or field of view. Digital zoom logic 290 is configured to control digital zooming of the captured images. Illustratively, an image captured by camera 222 includes a plurality of pixels within the camera field of view, each pixel having corresponding pixel values that represent the image acquired for a given field of view or focal area of the optical sensor. Example digital zoom operation selects a subset of these pixels (e.g., a portion of the image), effectively enlarging the selected portion of the image. This is often referred to as image cropping. Camera selection logic 292 is configured to select an active camera, from a plurality of cameras 222, 224, etc. to provide the camera view on display mechanism 260 based on the optical characteristics of the cameras and the image magnification factor.

Figures 1, 5:
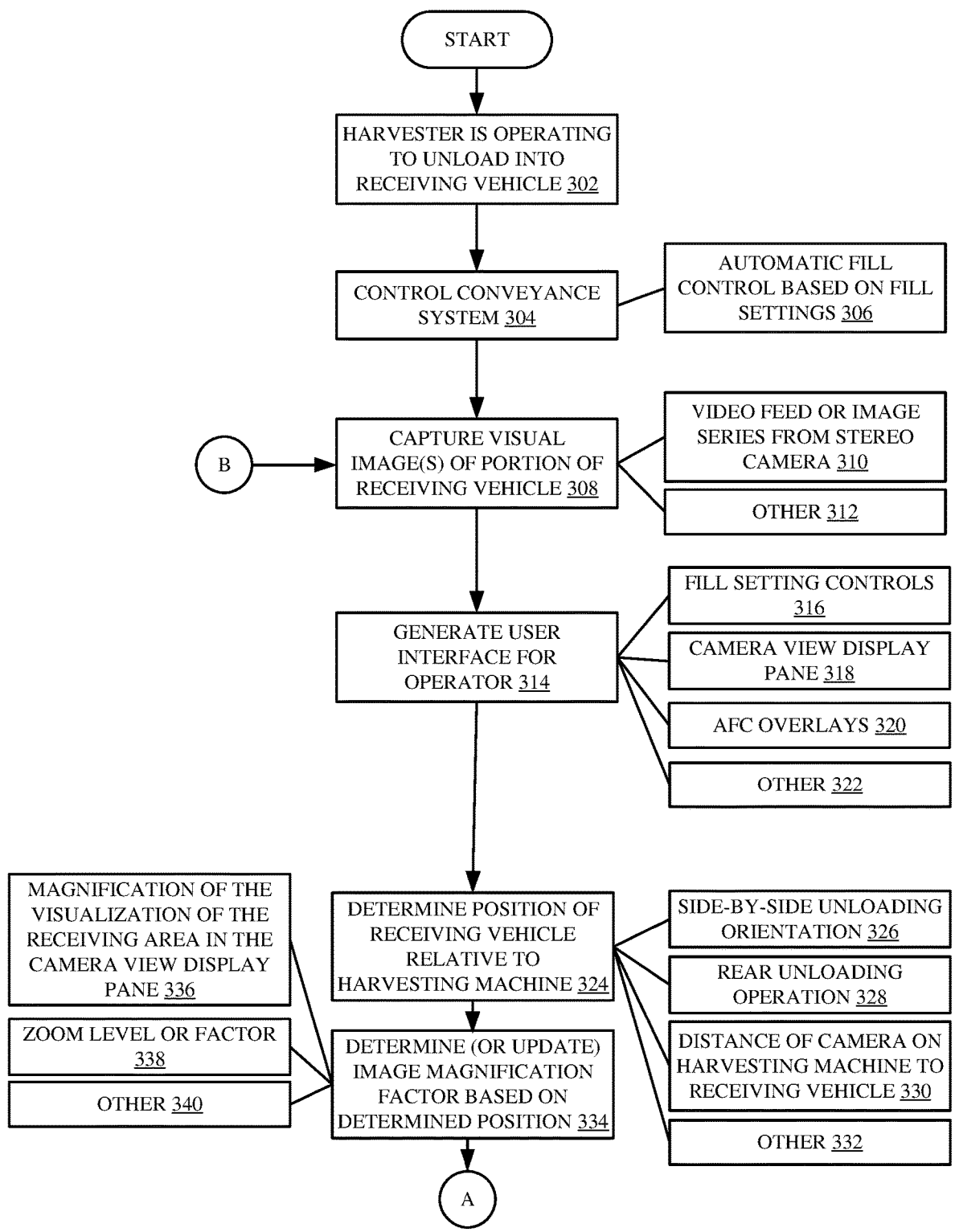
Figures 2, 5:
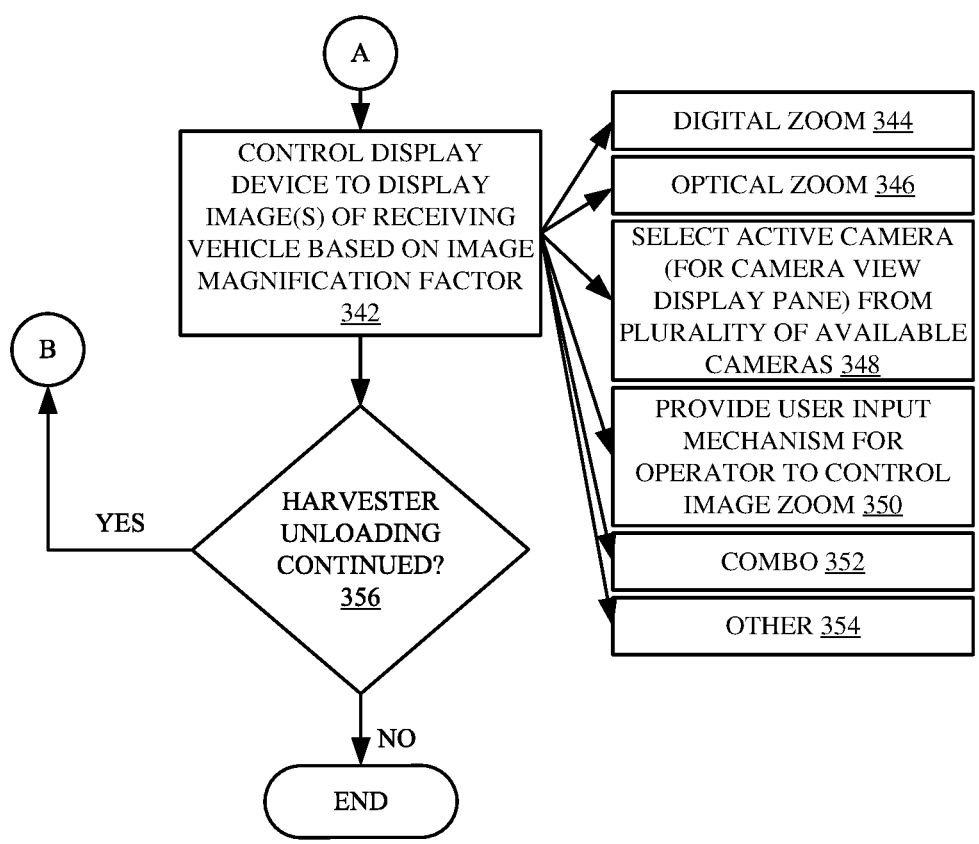

FIGS. 5-1 and 5-2 (collectively referred to as FIG. 5) is a flow diagram illustrating an example operation of a harvesting machine. For sake of illustration, but not by limitation, FIG. 5 will be described in the context of harvesting machine 200 discussed above with respect to FIG. 4.

At block 302, harvesting machine 200 is operating to gather harvested material into the harvesting machine and unloading the harvested material into receiving vehicle 256. As discussed above, in one example, harvesting machine 200 comprises a forage harvester that unloads the harvested material as the machine traverses the field. Examples are shown above with respect to FIGS. 1 and 2.

At block 304, control system 210 controls material conveyance subsystem 248, to control how the material is unloaded into receiving vehicle 256. In one example, this include automatic fill control by automatic vehicle filling control system 274, based on fill settings 282. This is represented at block 306.

At block 308, one or more visual images of a portion of receiving vehicle 256 are captured using optical sensor(s) 220. For example, a video feed or time series of images is received from stereo camera 222 mounted on the spout of material conveyance subsystem 248. This is represented at block 310. Of course, images can be captured in other ways as well. This is represented at block 312.

At block 314, control system 210 controls operator interface mechanisms 216 to generate a user interface display for operator 258 on display mechanism 260. One example of a user interface display is discussed above with respect to FIG. 3. The user interface display can include fill setting controls that can display the fill settings from block 306. The fill setting controls can also allow operator 258 to modify the fill settings, or to create new fill settings. This is represented at block 316.

The user interface display includes a camera view display pane (such as display pane 127 shown in FIG. 3). This is represented at block 318. The camera view display pane is configured to display the captured images, or at least a portion of the captured images. In one example, the user interface display includes automatic fill control overlays on the camera view display pane. This is represented at block 320. For example, an overlay can be generated on the camera view display pane to highlight or otherwise indicate the opening of the receiving vehicle 256, the crop landing point within receiving vehicle 256, the height or level of material at various points within receiving vehicle 256, etc. The user interface display can be generated with other elements and in other ways as well. This is represented at block 322.

At block 324, a position of receiving vehicle 256 relative to harvesting machine 200 is determined. This relative position can indicate whether receiving vehicle 256 is in a side unloading orientation (block 326) or a rear unloading orientation (block 328). Alternatively, or in addition, the relative position can indicate a distance from the location of the camera on harvesting machine 200 to the receiving area of receiving vehicle 256. This is represented at block 330. The distance determined at block 330 can indicate a distance from machine 200 to a portion of the receiving vehicle 256, a distance to the material receiving opening, or other distance indication. Of course, other relative position information can be generated as well. This is represented at block 332.

Figure 6:
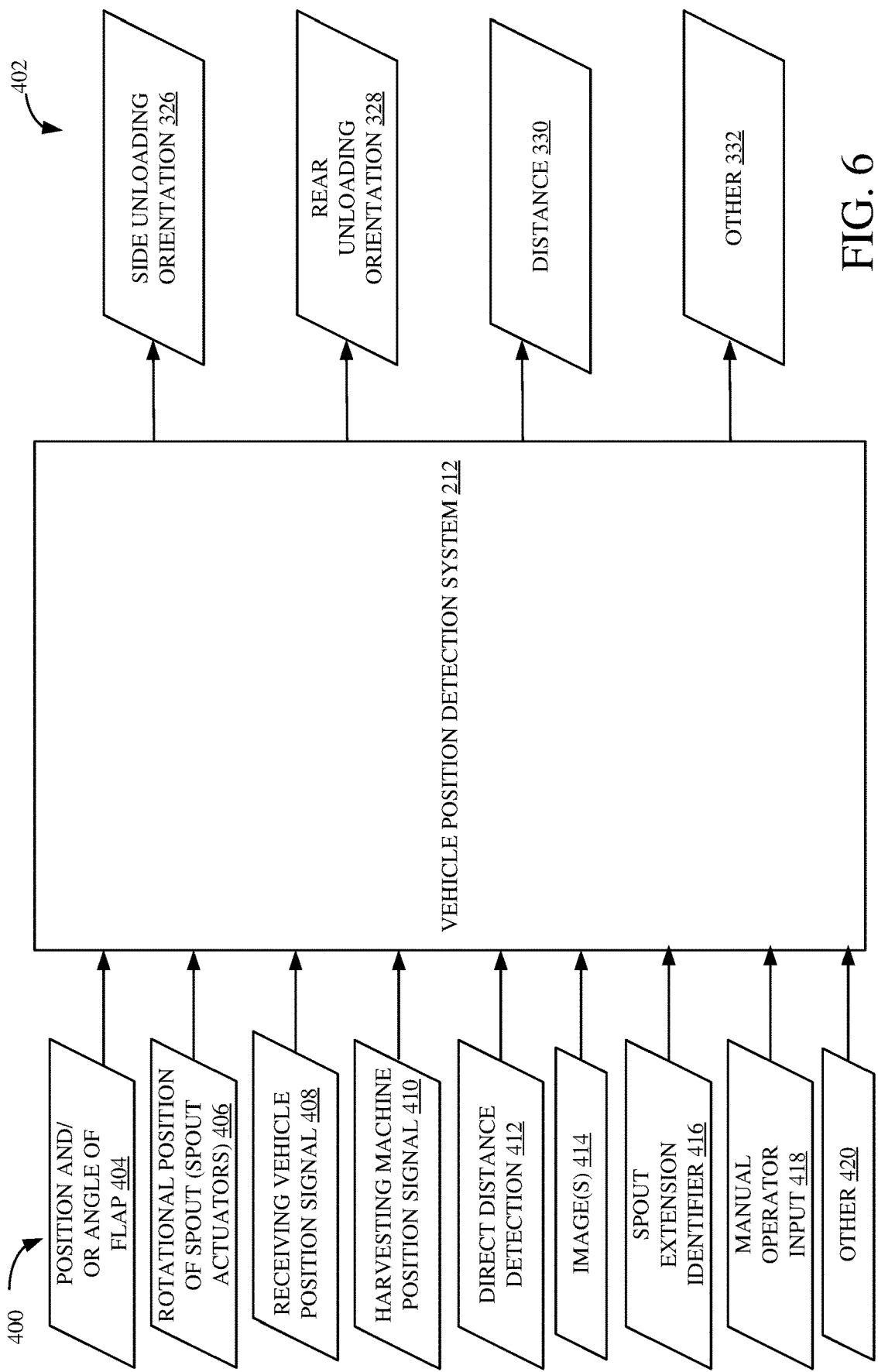
FIG. 6 is a schematic diagram illustrating one example of a vehicle position detection system.

FIG. 6 is a schematic diagram illustrating one example of vehicle position detection system 212 detecting the position of receiving vehicle 256 at block 324. As illustrated in FIG. 6, system 212 can receive a set of inputs 400 and generate a set of outputs 402.

Examples of inputs 400 include sensor signals indicating a position and/or angle of a flap at the output end of the spout (e.g., flap 109). This is represented at block 404. Based at least in part on the position and/or angle of the flap, system 212 can predict a crop landing location, and then determine whether that predicted crop landing location is behind (to the rear of in a direction of travel) machine 200. This can indicate that the conveyance subsystem 248 is currently in a rear unloading orientation. For example, the crop landing location can be determined using inverse kinematics. This, of course, is for sake of example only.

The inputs can also include a rotational position of the spout. This is represented at block 406. For example, a sensor signal can indicate a position of a spout actuator configured to rotate the spout between the side unloading orientation and the rear unloading orientation. The position of this actuator can be utilized to determine the rotational position of the spout.

The inputs can also include a receiving vehicle position signal 408 indicating a geographic position of receiving vehicle 256 in a coordinate system and/or a harvesting machine position signal 410 indicating a position of harvesting machine 200 in the coordinate system.

In one example, a distance to receiving vehicle 256 is directly detected by a non-contact sensor, such as LIDAR 228, RADAR 230, or other sensors 237. This is represented at block 412.

In one example, vehicle position detection system 212 receives one or more images 414 which are processed by image processing system 238. As discussed above, the images can be processed to identify a profile of the receiving vehicle 256 that is visible in the images (e.g., whether the front or side of receiving vehicle 256 is visible in the image(s)). Alternatively, or in addition, the image processing can identify a distance to the receiving vehicle 256, such as by processing stereo images.

In one example, an input representing a spout extension identifier 416 is received. As noted above, and illustrated in FIG. 2, a spout extension of an operator-selected size can be coupled to the spout, which changes the position of the camera relative to the receiving vehicle 256, for a given machine position. The spout extension identifier 416 indicates, either directly or indirectly, the length of the spout extension. For example, system 212 can identify the length of the spout extension by retrieving the dimensions from a lookup table based on identifier 416. The spout extension identifier 416 can be automatically detected based on the coupling of the spout extension to the spout. For example, the spout extension identifier (or a connection assembly such as a pin or bracket that couples the spout extension to the spout) can include a tag that actively transmits the identifier, or from which the identifier is read. In one example, an active or passive radio frequency identifier (RFID) tag is positioned on the spout extension and is read by control system 210 automatically upon coupling of the spout extension. In another example, the spout extension identifier 416 is communicated over a controller area network (CAN) bus.

In one example, the orientation and/or distance can be determined based on manual operator input. This is represented at block 418, such as through operator interface mechanisms 216. The orientation and/or distance can be determined in other ways as well. This is represented at block 520.

Returning again to FIG. 5, at block 334 an image magnification factor is determined (or updated) based on the determined position at block 334. In the illustrated example, the image magnification factor indicates a magnification of the visualization of the receiving area in the camera view display pane. This is represented at block 336. In one example, the magnification factor represents a zoom level or factor for zooming the image display of the portion of receiving vehicle 256 shown in the camera view display pane. This is represented at block 338. The magnification factor indicates, in one example, an amount by which the receiving area of the receiving vehicle 256 is to be enlarged on the displayed view to operator 258. This enhances the view provided to the operator when the conveyance system is switched from side unloading to rear unloading (i.e., when the camera position is further away from the receiving vehicle 256 compared to the side unloading orientation).

Of course, the magnification factor can be determined in other ways as well. This is represented at block 340.

At block 342, the display mechanism 260 (or other display device) is controlled to display images of receiving vehicle 256 based on the image magnification factor determined at block 334. For example, this can include controlling digital zooming of the visual images captured at block 308. This is represented at block 344. For instance, an image captured at block 308 has a plurality of pixels, each having pixel values, that represent the image acquired for a given field of view or focal area of the optical sensor.

In one example, block 342 can optically zoom the camera (or other optical sensor) being used to capture the images at block 308. This is represented at block 346. The optical zooming at block 346 controls the components of the camera (e.g., lens position), to change the field of view or focal length. In one example where multiple cameras (e.g., cameras 222, 224, etc.) are provided, the active camera being used to acquire images for the camera view display pane is selected at block 348. For example, but not by limitation, camera 222 can have a relatively wide field of view, and be utilized to acquire images of receiving vehicle 256 when in the side unloading orientation. However, upon switching to the rear unloading orientation, camera 224 having a more narrow field of view or longer focal length can be utilized to acquire images of receiving vehicle 256 which is positioned further away from the spout when in the rear unloading orientation, as compared to the side unloading orientation.

In another example, displaying the images based on the image magnification factor includes providing a user input mechanism for the operator to control image zoom (digital and/or optical zooming). For example, block 342 can determine a particular zoom factor, or range of zoom factors, and provide a slider mechanism that allows the user to zoom the camera view display pane using the zoom factor.

Of course, any of a variety of combinations of blocks 344-350 can be utilized. This is represented at block 352. For example, block 342 can include selecting a second camera 224 and digitally zooming the image, based on the image magnification factor. Of course, the display device can be controlled in other ways as well. This is represented at block 354.

At block 356, control system 210 determines whether harvesting machine 200 is continuing to unload harvested material into receiving vehicle 256. If so, the operation returns to block 308. Here, the image magnification factor can be updated at block 334 based on changes to the relative position of the receiving vehicle at block 324, which in turn dynamically changes the magnification of the camera view in the display pane.

It can thus be seen that the present description has proceeded with respect to a system that controls the capturing and/or display of images based on the relative position of a receiving vehicle during unloading or harvested material from a harvester. The operator is provided with a view of the receiving vehicle with a magnification factor based on the relative position of the receiving vehicle. This can improve the view of the unloading operation, the active fill control settings, as well as improve the operational efficiency in the unloading process. As noted above, even a momentary misalignment between the spout and vehicle can result in hundreds of pounds of harvested material being dumped on the ground, rather than in the vehicle. The above-mentioned control system facilitates improved control of the unloading process.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
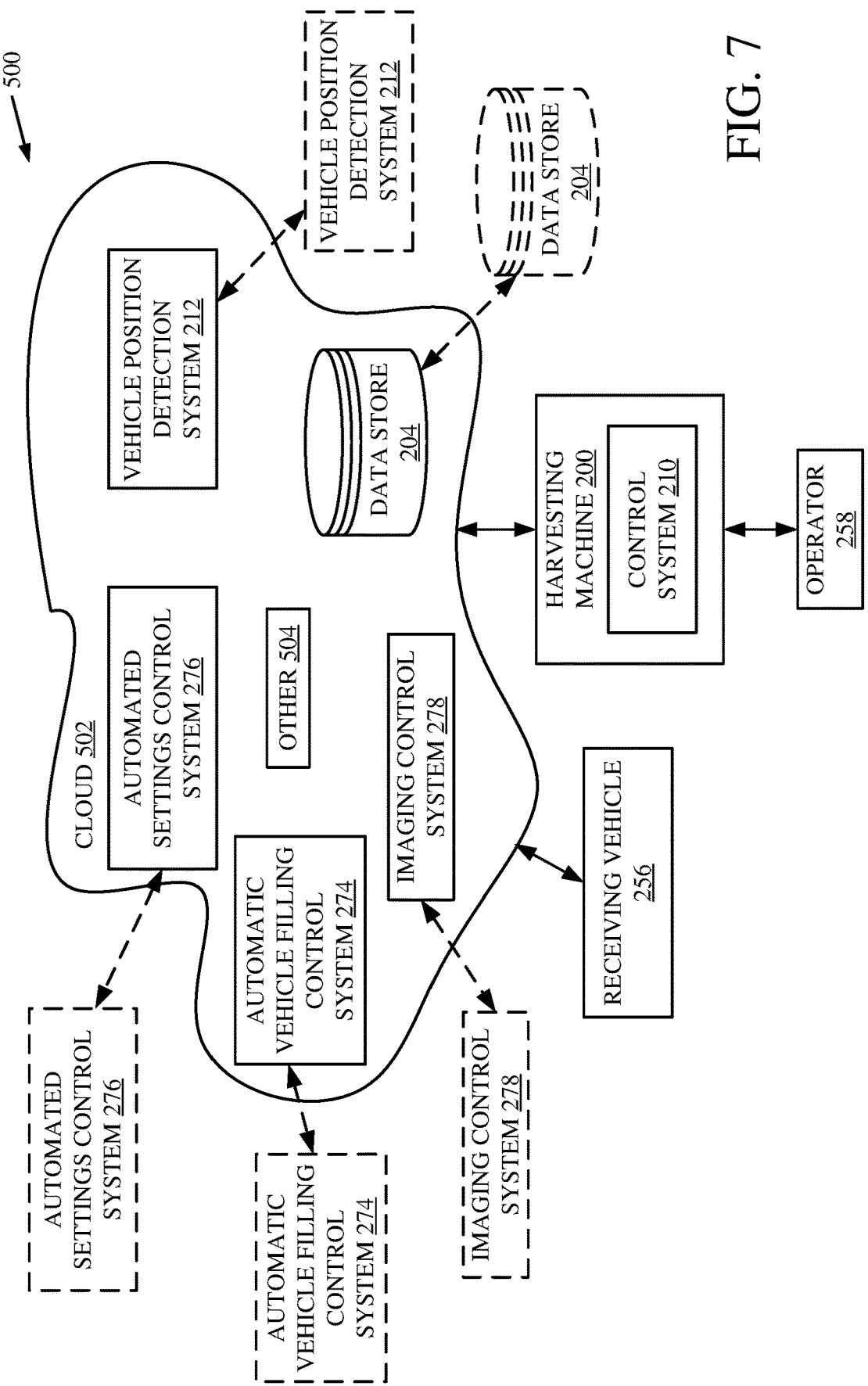
FIG. 7 is a block diagram showing one example of a harvesting machine deployed in a remote server architecture.

FIG. 7 is a block diagram illustrating harvesting machine 200, shown in FIG. 4, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 4 and they are similarly numbered. FIG. 7 specifically shows that data store 204, vehicle position detection system 212, automatic vehicle filling control system 274, automated settings control system 276 and/or imaging control system 278 (or other items 504) can be located at a remote server location 502. Therefore, harvesting machine 200 accesses those systems through remote server location 502.

FIG. 7 also depicts another example of a remote server architecture. FIG. 7 shows that it is also contemplated that some elements of FIG. 4 can be disposed at remote server location 502 while others are not. By way of example, one or more of data store 204, vehicle position detection system 212, automatic vehicle filling control system 274, automated settings control system 276, imaging control system 278 or other items can be disposed at a location separate from location 502, and accessed through the remote server at location 502. Regardless of where they are located, they can be accessed directly by harvesting machine 200, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. All of these architectures are contemplated herein.

It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
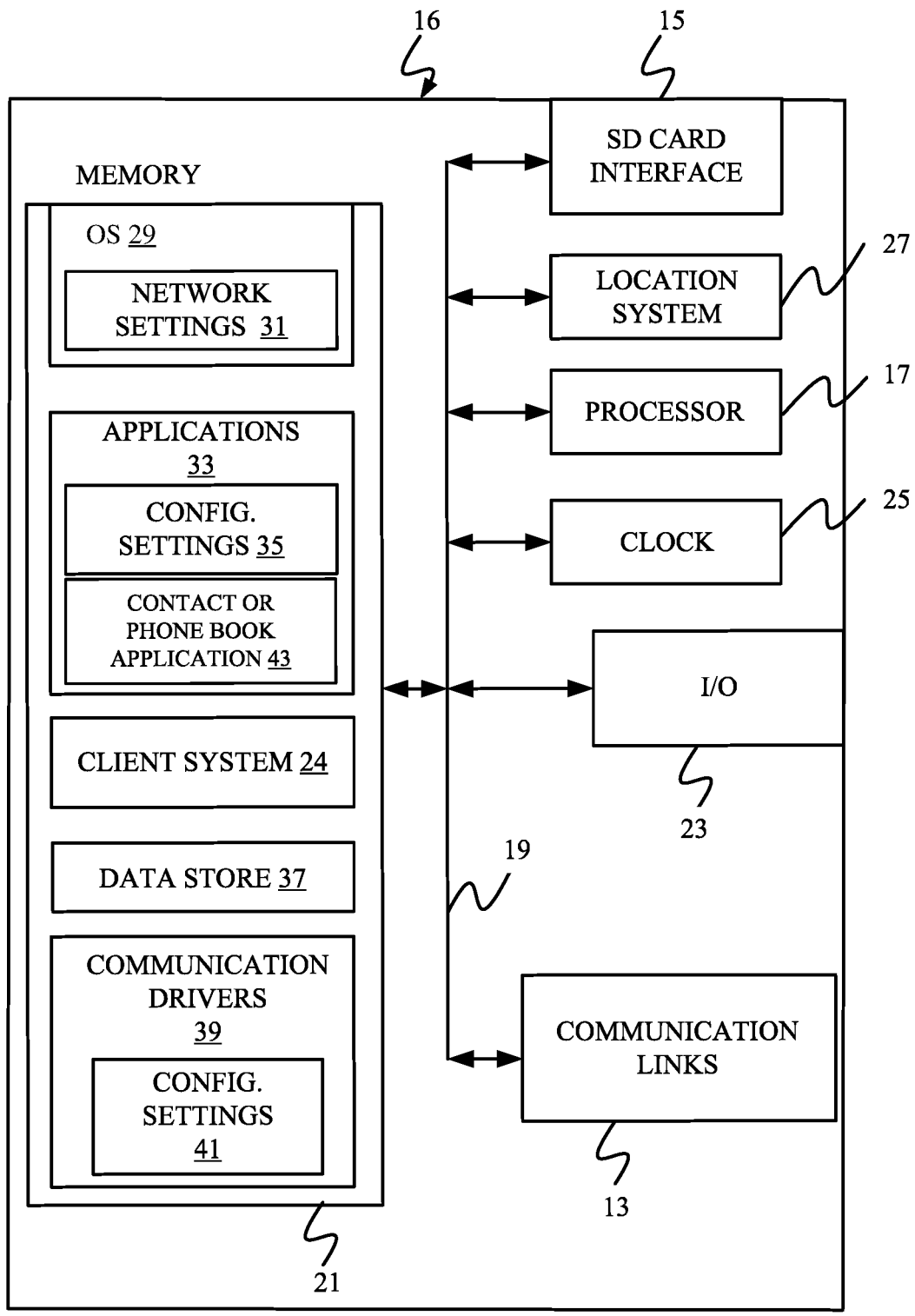
FIGS. 8-10 show examples of mobile devices that can be used in the machines described in previous figures.
Figure 9:
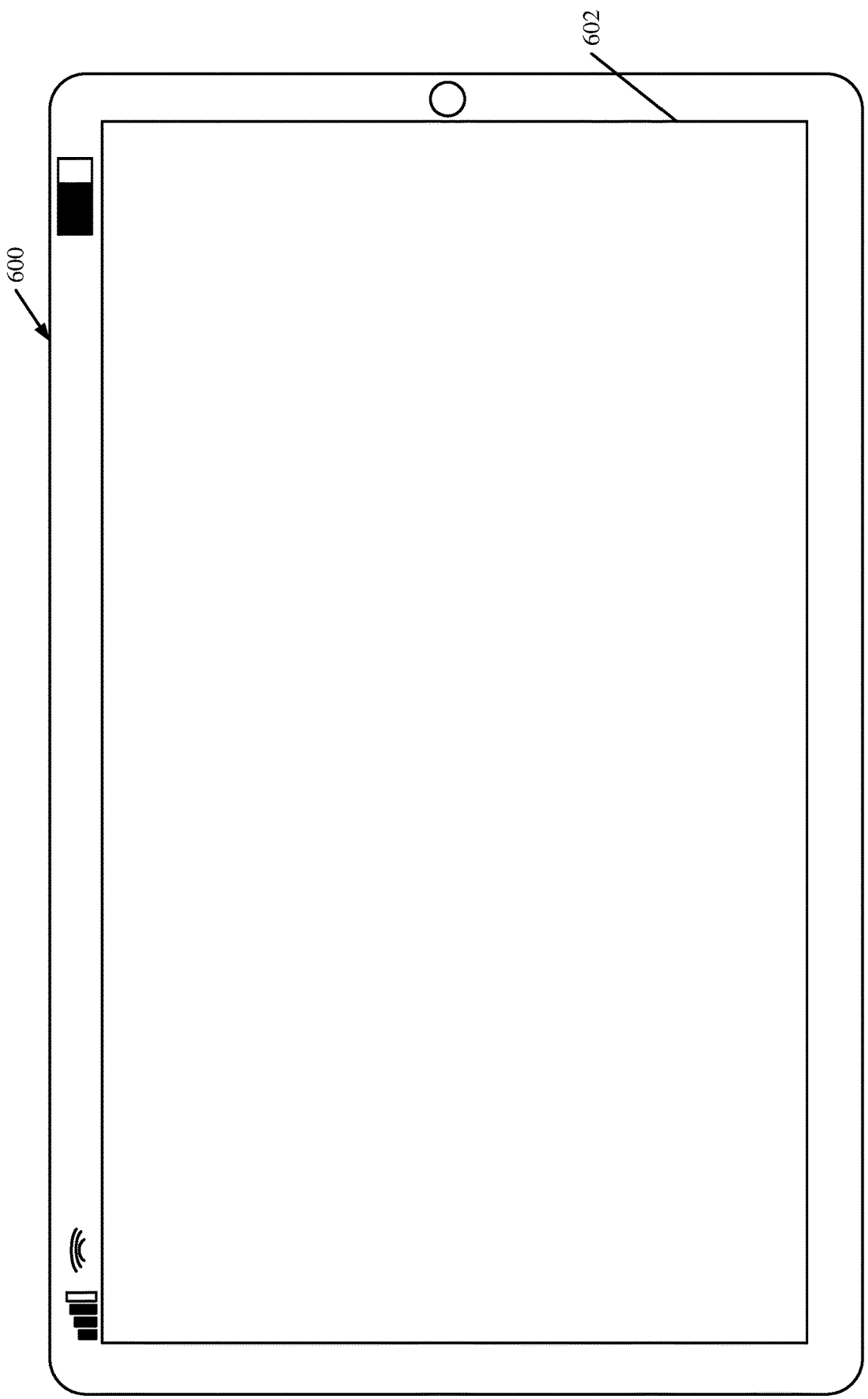
Figure 10:
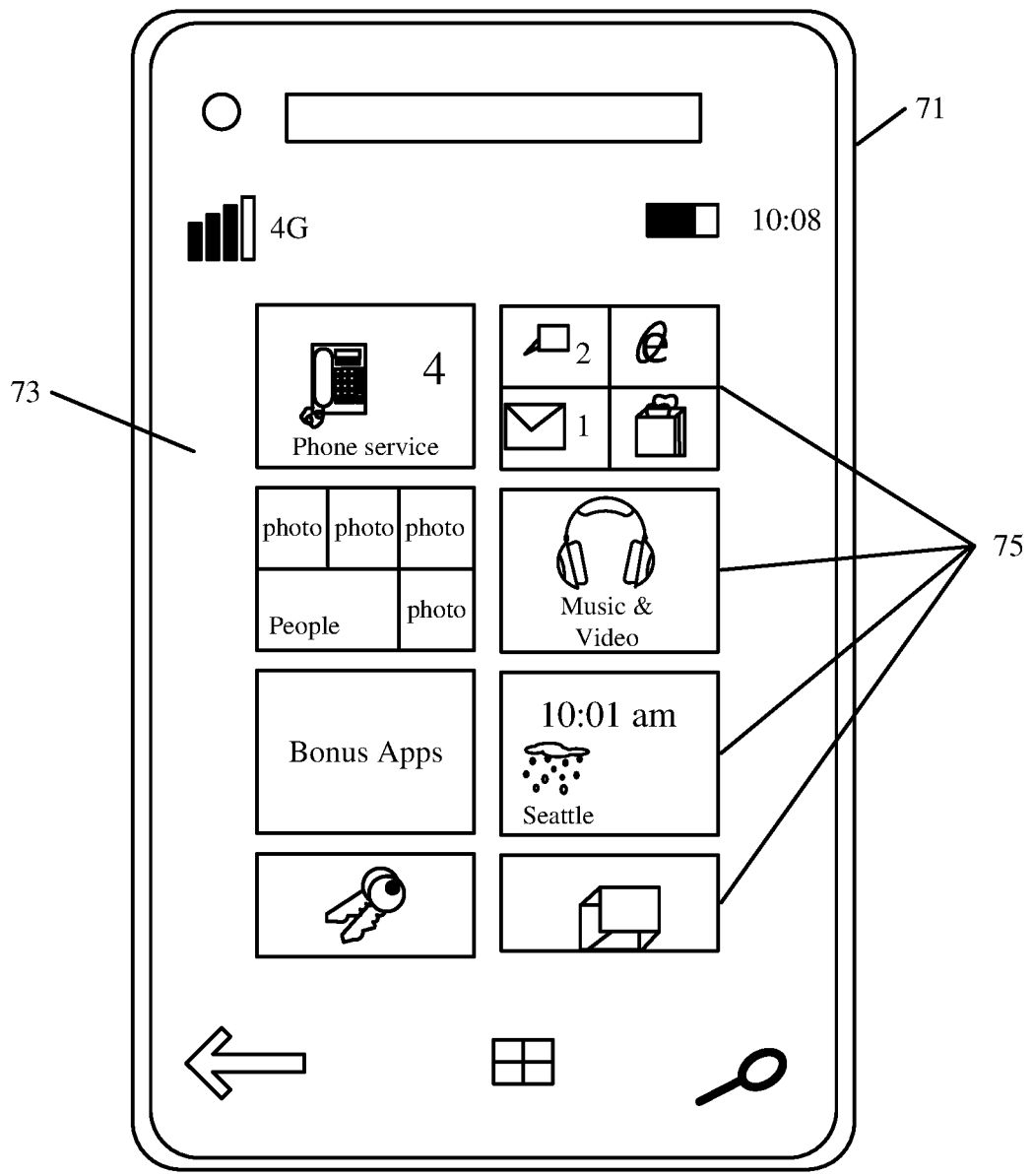

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of harvesting machine 200 for use in generating, processing, or displaying the images from camera 106, the settings are actuators, etc. FIGS. 9-10 are examples of handheld or mobile devices.

FIG. 8 provides a general block diagram of the components of a client device 16 that can run some components shown in FIG. 4, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
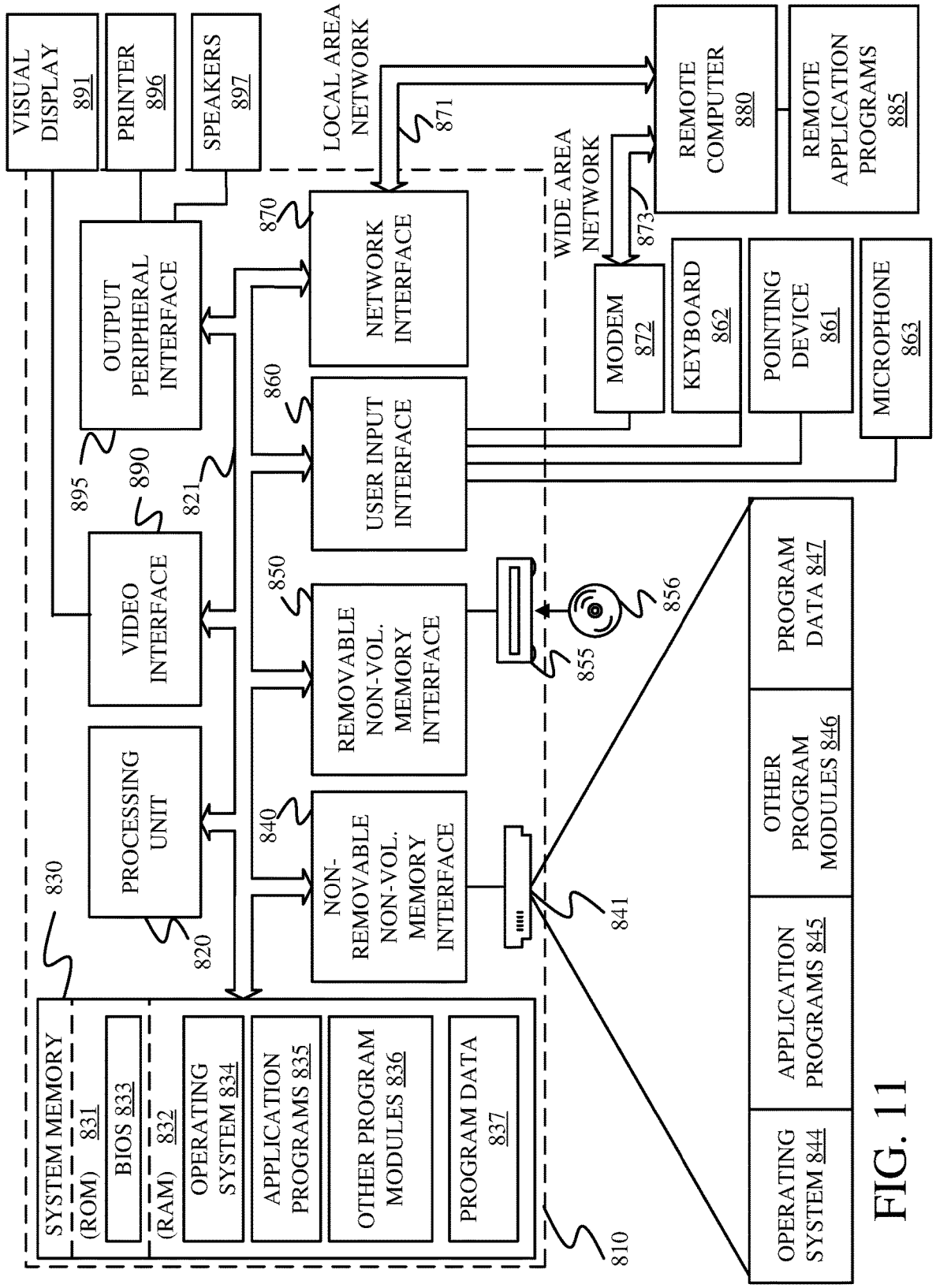
FIG. 11 is a block diagram showing one example of a computing environment that can be used in the machines and systems described with respect to previous figures.

FIG. 11 is one example of a computing environment in which elements of FIG. 4, or parts of it, (for example) can be deployed. With reference to FIG. 11, an example system for implementing some embodiments includes a general-purpose computing device in the form of a computer 810 programmed to operate as discussed above. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different example described herein can be combined in different ways. That is, parts of one or more examples can be combined with parts of one or more other examples. All of this is contemplated herein.

Example 1 is a harvesting machine comprising:
a header configured to gather harvested material into the harvesting machine during a harvesting operation;
a conveyance subsystem configured to convey the harvested material from the harvesting machine to a receiving vehicle during the harvesting operation;
an image capture system comprising at least one optical sensor; and
a control system configured to:
determine a position of the receiving vehicle relative to the harvesting machine;
determine an image magnification factor based on the determined position; and
display, on a display device, an image of a portion of the receiving vehicle based on the image magnification factor.

Example 2 is the harvesting machine of any or all previous examples, wherein the at least one optical sensor generates a sensor signal representing a captured image comprising a plurality of pixels, and the control system comprises digital zoom logic configured to select a set of the pixels based on the image magnification factor.

Example 3 is the harvesting machine of any or all previous examples, wherein the at least one optical sensor comprise a camera having a variable focal length, and the control system is configured to control optical zoom of the camera to capture the image based on the image magnification factor.

Example 4 is the harvesting machine of any or all previous example, wherein the conveyance subsystem comprises a spout actuatable between a side-unloading configuration and a rear-unloading configuration, and the determined position indicates that the conveyance subsystem is in a particular one of the side-unloading configuration or the rear-unloading configuration.

Example 5 is the harvesting machine of any or all previous examples, wherein the control system is configured to:
receive a receiving vehicle position signal, indicative of a position of the receiving vehicle in a coordinate system, from a positioning system on the receiving vehicle;
receive a harvesting machine position signal, indicative of a position of the harvesting machine in the coordinate system, from a positioning system on the harvesting machine; and
determine that the conveyance subsystem is in the particular configuration based on the receiving vehicle position signal and the harvesting machine position signal.

Example 6 is the harvesting machine of any or all previous examples, wherein the control system is configured to determine that the conveyance subsystem is in the particular configuration based on at least one of:
a predicted crop landing location based on detected characteristics of the conveyance subsystem; or
a detected orientation of the spout.

Example 7 is the harvesting machine of any or all previous examples, wherein the control system is configured to determine that the conveyance subsystem is in the particular configuration based on image processing performed on the image.

Example 8 is the harvesting machine of any or all previous examples, wherein the determined position of the receiving vehicle relative to the harvesting machine represents a distance between the harvesting machine and the receiving vehicle.

Example 9 is the harvesting machine of any or all previous examples, wherein the control system is configured to:
detect a spout extension; and
determine the distance based on the spout extension.

Example 10 is the harvesting machine of any or all previous examples, wherein the distance is determined based on image processing performed on the image.

Example 11 is the harvesting machine of any or all previous examples, wherein the control system is configured to update the image magnification factor based on changes to the distance between the harvesting machine and the receiving vehicle.

Example 12 is the harvesting machine of any or all previous examples, wherein the control system comprises:
an automatic cart filling control system configured to automatically control a position of the conveyance subsystem based on the image.

Example 13 is the harvesting machine of any or all previous examples, wherein the at least one optical sensor comprises a plurality of optical sensors with different field-of-view characteristics, and the control system is configured to:
select one of the optical sensors based on the image magnification factor; and
receive the image from the selected optical sensor.

Example 14 is the harvesting machine of any or all previous examples, wherein the control system is configured to generate an image zoom user input mechanism based on the image magnification factor, display the image zoom user input mechanism on the display device, and control image zoom based on actuation of the image zoom user input mechanism.

Example 15 is a computer-implemented method of controlling a harvesting machine, the method comprising:
controlling a conveyance subsystem to convey harvested material from the harvesting machine to a receiving vehicle;
determining a position of the receiving vehicle relative to the harvesting machine;
determining an image magnification factor based on the determined position
controlling a display device to display an image of a portion of the receiving vehicle based on the image magnification factor.

Example 16 is the computer-implemented method of any or all previous examples, wherein the conveyance subsystem comprises a spout actuatable between a side-unloading configuration and a rear-unloading configuration, and the determined position indicates that the conveyance subsystem is in a particular one of the side-unloading configuration or the rear-unloading configuration.

Example 17 is the computer-implemented method of any or all previous examples, wherein determining a position of the receiving vehicle comprises determining a distance between the harvesting machine and the receiving vehicle.

Example 18 is the computer-implemented method of any or all previous examples, wherein the at least one optical sensor comprises a plurality of optical sensors with different optical characteristics, and controlling the display device to display an image comprises:
selecting one of the optical sensors based on the image magnification factor; and
receiving the image from the selected optical sensor.

Example 19 is the computer-implemented method of any or all previous examples, wherein controlling the display device to display the image comprises generating an image zoom user input mechanism based on the image magnification factor, displaying the image zoom user input mechanism on the display device, and controlling image zoom based on user actuation of the image zoom user input mechanism.

Example 20 is a harvester control system that controls a harvester to load a receiving vehicle with harvested material, the harvester control system comprising:
an image processing system configured to process images of at least a portion of the receiving vehicle;
an automatic vehicle filling control system configured to automatically control a position of a conveyance subsystem that conveys the harvested material to the receiving vehicle based on the processing of the images; and
an imaging control system configured to:
determine a position of the receiving vehicle relative to the harvesting machine;
generate a user interface display that visually represents a view of the portion of the receiving vehicle based on the images; and
visually zooming the view in the user interface display based on the determined position of the receiving vehicle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A harvesting machine comprising:
a header configured to gather harvested material into the harvesting machine during a harvesting operation;
a conveyance subsystem configured to convey the harvested material from the harvesting machine to a receiving vehicle during the harvesting operation;
an image capture system comprising at least one optical sensor; and
a control system configured to:
determine a position of the receiving vehicle relative to the harvesting machine;
determine an image magnification factor based on the position;
generate a user interface display that displays, on a display device, an image of a portion of the receiving vehicle based on the image magnification factor;
augment the user interface display with one or more display elements that identify at least one of a landing point or a height of the harvested material in the receiving vehicle; and
provide one or more user interface controls actuatable to control at least one of a spout position, a spout flap angle, or a speed of the harvesting machine.

2. The harvesting machine of claim 1, wherein the at least one optical sensor generates a sensor signal representing a captured image comprising a plurality of pixels, and the control system comprises digital zoom logic configured to select a set of the pixels based on the image magnification factor.

3. The harvesting machine of claim 1, wherein the at least one optical sensor comprises a camera having a variable focal length, and the control system is configured to control optical zoom of the camera to capture the image based on the image magnification factor.

4. The harvesting machine of claim 1, wherein
the conveyance subsystem comprises a spout actuatable between a side-unloading configuration and a rear-unloading configuration, and
the control system is configured to configured to:
select a first image magnification factor for displaying the image on the display device based on a determination that the spout is in the side-unloading configuration, and
select a second image magnification factor, different than the first image magnification factor, for displaying the image on the display device based on a determination that the spout is in the rear-unloading configuration.

5. The harvesting machine of claim 4, wherein the control system is configured to:
a receive a receiving vehicle position signal, indicative of the position of the receiving vehicle in a coordinate system, from a positioning system on the receiving vehicle;
receive a harvesting machine position signal, indicative of a position of the harvesting machine in the coordinate system, from a positioning system on the harvesting machine; and
determine that the conveyance subsystem is in the side-unloading configuration or the rear unloading configuration based on the receiving vehicle position signal and the harvesting machine position signal.

6. The harvesting machine of claim 4, wherein the control system is configured to determine that the conveyance subsystem is in the side-unloading configuration or the rear-unloading configuration based on at least one of:
a predicted crop landing location based on detected characteristics of the conveyance subsystem; or a detected orientation of the spout.

7. The harvesting machine of claim 4, wherein the control system is configured to determine that the conveyance subsystem is in the side-unloading configuration or the rear-unloading configuration based on image processing performed on the image.

8. The harvesting machine of claim 1, wherein the position of the receiving vehicle relative to the harvesting machine represents a distance between the harvesting machine and the receiving vehicle.

9. The harvesting machine of claim 8, wherein the control system is configured to:
   detect a spout extension; and
   determine the distance based on the spout extension.

10. The harvesting machine of claim 8, wherein the control system is configured to update the image magnification factor based on changes to the distance between the harvesting machine and the receiving vehicle.

11. The harvesting machine of claim 1, wherein the control system comprises:
    an automatic cart filling control system configured to automatically control a position of the conveyance subsystem based on the image.

12. The harvesting machine of claim 1, wherein the at least one optical sensor comprises a plurality of optical sensors with different field-of-view characteristics, and the control system is configured to:
    select a particular optical sensor, from the plurality of optical sensors, based on the image magnification factor; and
    receive the image from the particular optical sensor.

13. The harvesting machine of claim 1, wherein the control system is configured to generate an image zoom user input mechanism based on the image magnification factor, display the image zoom user input mechanism on the display device, and control image zoom based on actuation of the image zoom user input mechanism.

14. A computer-implemented method of controlling a harvesting machine, the method comprising:
    controlling a conveyance subsystem to convey harvested material from the harvesting machine to a receiving vehicle, wherein the conveyance subsystem being configurable between
       a rear-unloading configuration in which the receiving vehicle is behind the harvesting machine relative to a direction of travel of the harvesting machine, and
       a side-unloading configuration in which the receiving vehicle is along side the harvesting machine;
    receiving an image of a portion of the receiving vehicle;
    determining an image magnification factor based on whether the conveyance subsystem is in the rear-unloading configuration or the side-unloading configuration; and
    a controlling a display device to display the image based on the image magnification factor.

15. The computer-implemented method of claim 14, wherein determining a position of the receiving vehicle comprises determining a distance between the harvesting machine and the receiving vehicle.

16. The computer-implemented method of claim 14, further comprising:
    selecting a selected optical sensor, from a plurality of optical sensors with different optical characteristics, based on the image magnification factor; and
    receiving the image from the selected optical sensor.

17. The computer-implemented method of claim 14, wherein controlling the display device to display the image comprises generating an image zoom user input mechanism based on the image magnification factor, displaying the image zoom user input mechanism on the display device, and controlling image zoom based on user actuation of the image zoom user input mechanism.

18. A harvester control system that controls a harvester to load a receiving vehicle with harvested material, the harvester control system comprising:
    an image processing system configured to perform image processing on the images of at least a portion of the receiving vehicle;
    an automatic vehicle filling control system configured to automatically control a position of a conveyance subsystem that conveys the harvested material to the receiving vehicle based on the image processing; and
    an imaging control system configured to:
       determine a position of the receiving vehicle relative to the harvester;
       generate a user interface display that visually represents a view of the portion of the receiving vehicle based on the images; and
       visually zooming the view in the user interface display based on the position of the receiving vehicle, wherein the harvester control system is configured to:
          augment the user interface display to identify at least one of a landing point or a height of the harvested material in the receiving vehicle; and
          provide one or more user interface controls actuatable to control at least one of a spout position, a spout flap angle, or a speed of the harvester.

* * * * *